United States Patent
Bisconti

[11] Patent Number: 5,868,981
[45] Date of Patent: Feb. 9, 1999

[54] INJECTION MOULDING PROCESS FOR SOLES IN EXPANSIBLE AND CROSS-LINKING "EVA" BASED COMPOUNDS

[75] Inventor: Bruno Bisconti, Civitanova Marche, Italy

[73] Assignee: Finproject—S.p.A., Rome, Italy

[21] Appl. No.: 806,630

[22] Filed: Feb. 26, 1997

[30] Foreign Application Priority Data

Apr. 19, 1996 [IT] Italy .............................. AN96 A 0007

[51] Int. Cl.[6] .................................................. B29C 44/02
[52] U.S. Cl. ......................... 264/51; 264/321; 264/342 R
[58] Field of Search ............................... 264/51, 53, 237, 264/342 R, 348, 321

[56] References Cited

U.S. PATENT DOCUMENTS

| | | | |
|---|---|---|---|
| 3,739,414 | 6/1973 | Skelham | 12/142 R |
| 3,798,693 | 3/1974 | Bruggi | 12/87 |
| 4,476,084 | 10/1984 | Takada et al. | 264/237 |
| 4,810,178 | 3/1989 | Proll et al. | 425/112 |
| 5,141,578 | 8/1992 | Yang | 264/45.1 |
| 5,147,589 | 9/1992 | Chang et al. | 264/45.1 |
| 5,177,824 | 1/1993 | Ou | 264/55 |
| 5,308,420 | 5/1994 | Yang | 264/45.1 |
| 5,318,645 | 6/1994 | Yang | 264/45.1 |
| 5,352,105 | 10/1994 | Yang | 425/129.2 |
| 5,549,310 | 8/1996 | Meibock et al. | 280/11.22 |

*Primary Examiner*—Allan R. Kuhns
*Attorney, Agent, or Firm*—Beveridge, DeGrandi, Weilacher & Young, L.L.P.

[57] ABSTRACT

This invention concerns an injection moulding process for soles in expansible and cross-linking "EVA" based compounds characterised in that during the cooling stage of the moulded sole the spontaneous shrinkage of the same is arrested by means of a template consisting of a rigid shaped plate placed on the sole so that its edge connects with a perimeter edge realised specifically on the upper surface of the sole, whose dimensions reduce no further either during the remaining cooling phase of after cooling.

2 Claims, 1 Drawing Sheet

TAV. 1-1

INJECTION MOULDING PROCESS FOR SOLES IN EXPANSIBLE AND CROSS-LINKING "EVA" BASED COMPOUNDS

This patent application concerns an injection moulding process for soles in expansible and cross-linking "EVA" based compounds.

The patent protection is also extended to the sole obtained with the process according to the invention.

The abbreviation "EVA" refers to "vinyl-acetate ethylene copolymer" which, according to the type of additive used, may be thermoplastic or expansible and cross-linking.

In the case of the latter type, an expanding powder additive is used which decomposes at a specific temperature to produce gases which give rise to a typical phenomenon which occurs in injection moulding using this type of "EVA", consisting of the instantaneous expansion of the part as soon as the mould is opened.

In particular the dimensions of the part increase rapidly while the proportions and shape remain unaltered thus maintaining a ratio of perfect similarity with the impression of the matrix.

Expansible and cross-linking "EVA", thanks above all to its low cost, is widely used in the footwear sector for the production of inexpensive injection moulded soles.

It is not however currently possible with this material to mould soles with a raised trim along the sides since the expansion of the part when the mould is opened requires the perimeter of the sole to be milled in order to reduce the sole to the necessary dimensions.

In other words, since it is not possible to control this expansion precisely, it is currently necessary to dimension— according to the expansion ratio of the material and that of its shrinkage during cooling—the impression of the mould so that the cooled moulded sole is slightly oversized with respect to the nominal dimensions of the sole sizes in question, which are obtained by milling away a surface layer of material along the entire perimeter of the sole.

It is thus obvious why this material and moulding system can not be used for soles which have a raised trim, such as a welt, a part or all of which would be removed when the sides of the sole are milled.

The purpose of this invention is to design an injection moulding process for soles made of expansible and cross-linking "EVA" that makes it possible to produce a perfectly sized sole and to eliminate the costs and limitations of the milling which is currently necessary to size soles made of expansible and cross-linking "EVA" compounds.

The process according to the invention derives from an idea for a solution which is, in general terms, exactly opposite to that on which current production techniques are based.

According to this innovative idea, based on the expansion ratio of the material and that of its shrinkage during cooling, the impression of the mould is designed so that the moulded sole is slightly undersized after cooling and shrinkage with respect to the nominal dimensions of the size in question, which are however strictly respected by arresting the spontaneous shrinkage of the sole during cooling.

For this purpose, the process according to the invention involves the use of a template consisting of a thin and flexible plate of rigid material placed during cooling so as to adhere on the moulded sole which in turn has a raised perimeter edge along its upper surface, that surrounds and holds the edge of the template before cooling is completed, thereby preventing additional shrinkage of the sole whose dimensions reduce no further either during or after cooling.

BRIEF DESCRIPTION OF THE DRAWINGS

For clarity the description of the process according to the invention continues with reference to the enclosed drawings which are intended for purposes of illustration and not in a limiting sense and which schematically show the moulded sole before and after shrinkage following cooling, whereby.

DETAILED DESCRIPTION OF THE INVENTION

Before describing the operating stages of the moulding process according to the invention, it is important to remember that in order to realise the process according to the invention, the moulding system must be designed to ensure that the sole off the mould after complete and spontaneous shrinkage is slightly undersized with respect to the nominal dimensions of the size in question. Moreover the impression of the mould must be designed so that the sole off the mould, regardless of its shape or pattern of the treading surface and sides, has a raised perimeter edge on its upper surface.

This being so, the actual moulding process is attained according to current technology by injecting granules of expansible and cross-linking "EVA" compound into a mould, maintained at a specific temperature to ensure that during the time the material remains in the mould, cross-linking and decomposition of the expanding filler, occur.

Figure 1:
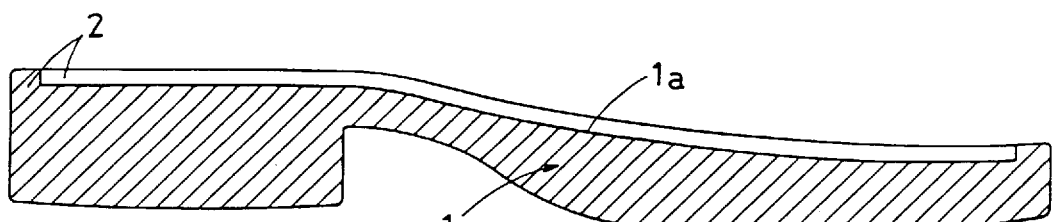
FIG. 1 is a cross-section along a longitudinal plane of the sole injected with expansible and cross-linking "EVA" compounds immediately off the mould in maximum expansion dimensions.
Figure 3:
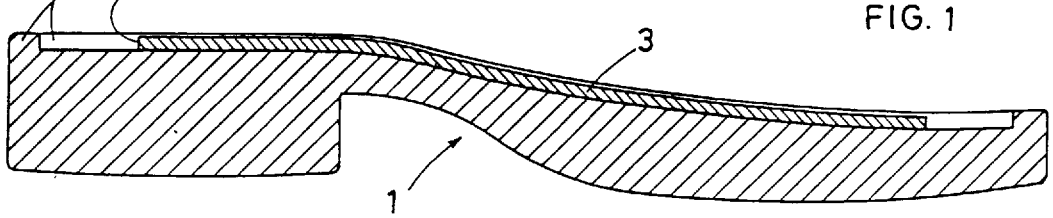
FIG. 3 is a cross-section of the sole in FIG. 2 along a longitudinal plane III—III.
Figure 2:
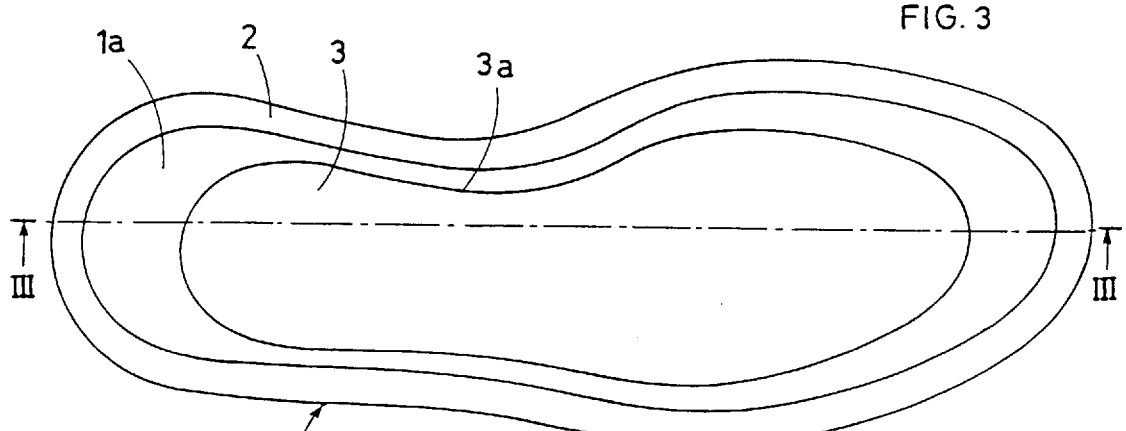
FIG. 2 is a top view of the sole in FIG. 1 on which the template designed to arrest the spontaneous shrinkage of the sole during the post-moulding cooling stage, is placed.
Figure 4:
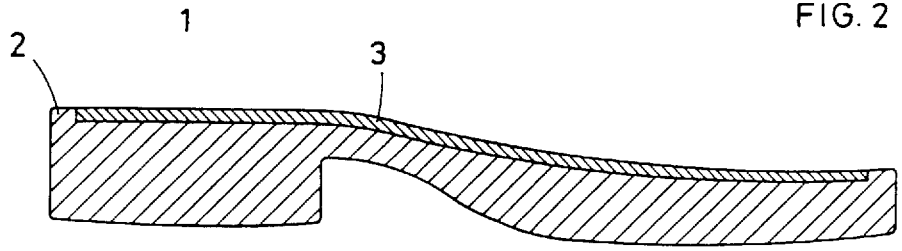
FIG. 4 is a cross-section along a longitudinal plane of the sole according to the invention at the stage in which the perimeter edge of the sole and template join, during the spontaneous shrinkage phase.

This conventional moulding phase produces a sole of the type illustrated in FIG. 1 which, as mentioned above, shows the sole in the maximum dimensions of expansion, that the sole attains immediately the mould is opened.

As can be seen in FIG. 1, sole (1) is characterised by a raised perimeter edge (2) along its upper surface (1a).

According to the process in question, a template (3) is placed on the sole (1) immediately off the mould, said template consisting of a thin flexible plate made of solid material such as solid PVC, having a profile similar to that of the sole (1) but sized to fit into the perimeter edge (2), which, before completion of the cooling process, encircles and holds the edge (3a) of said template (3), so as to prevent additional shrinkage of the sole whose dimensions reduce no further either during or after cooling.

After cooling, template (3) is pryed off the edge (2) by which it is encircled.

Figure 5:
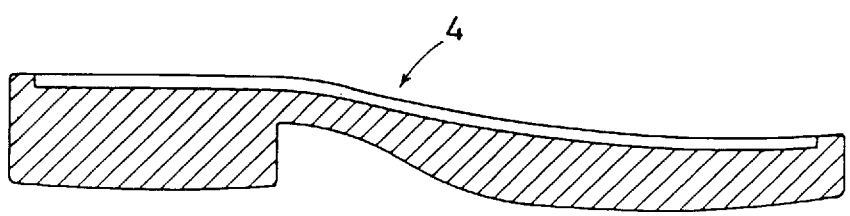
FIG. 5 is a cross-section along a longitudinal plane of the sole produced with the moulding system according to the invention.

The sole (4) thus obtained, is shown in FIG. 5, with the same shape but reduced dimensions with respect to the sole (1) shown in FIG. 1.

The dimensions of the template (3) must therefore be sized to ensure that the shrinkage of the sole (1), during cooling, is stopped when the dimensions of the sole correspond exactly to the nominal dimensions of the sole size in question.

Finally, in order to ensure perfect adhesion of the template (3) on the sole (1), the process according to the invention provides that a slight pressure be created on the template, during cooling, by suitable means, the most convenient and simplest of which may consist of small weights placed on the template (3).

I claim:

1. An injection moulding process for producing a moulded sole from expansible and cross-linking "EVA" based compounds comprising:

injecting expansible and cross-linking "EVA" based compound granules into a mould for forming said moulded sole whose impression is on one hand sized to ensure that the sole when removed from the mould after spontaneous and complete shrinkage, is slightly undersized with respect to the nominal dimensions of the desired sole size, and on the other hand is shaped so that said moulded sole has a raised perimeter edge on its upper surface, placing a template consisting of a thin flexible plate made of solid material having a profile similar to that of the sole but sized to fit into the perimeter edge on the upper surface of the sole when removed from the mould and during cooling; maintaining said template in said perimeter edge until cooling of said moulded sole is completed; and extracting the template from the moulded sole after cooling of said moulded sole.

2. The process according to claim 1 wherein the template is subject to a slight pressure in order to ensure perfect adhesion on the upper surface of the sole in the perimeter edge.

* * * * *